(12) United States Patent
Lee et al.

(10) Patent No.: US 10,813,134 B2
(45) Date of Patent: Oct. 20, 2020

(54) METHOD AND APPARATUS FOR PERFORMING ACCESS BARRING CHECK

(71) Applicant: LG ELECTRONICS INC., Seoul (KR)

(72) Inventors: Youngdae Lee, Seoul (KR); Hyunjung Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/971,565

(22) Filed: May 4, 2018

(65) Prior Publication Data

US 2018/0324866 A1 Nov. 8, 2018

Related U.S. Application Data

(60) Provisional application No. 62/501,775, filed on May 5, 2017.

(51) Int. Cl.
| | |
|---|---|
| *H04W 74/08* | (2009.01) |
| *H04W 76/27* | (2018.01) |
| *H04W 48/02* | (2009.01) |
| *H04W 76/18* | (2018.01) |
| *H04W 88/02* | (2009.01) |

(52) U.S. Cl.
CPC ....... *H04W 74/0833* (2013.01); *H04W 48/02* (2013.01); *H04W 76/18* (2018.02); *H04W 76/27* (2018.02); *H04W 88/02* (2013.01)

(58) Field of Classification Search
CPC . H04W 74/0833; H04W 76/18; H04W 76/27; H04W 48/02; H04W 48/04; H04W 88/02
See application file for complete search history.

(56) References Cited

U.S. PATENT DOCUMENTS

| | | | | |
|---|---|---|---|---|
| 6,751,472 B1* | 6/2004 | Muhonen | ............... | H04W 88/02 370/329 |
| 8,121,093 B2* | 2/2012 | Chen | ..................... | H04W 48/20 370/331 |
| 8,412,190 B1* | 4/2013 | Moisanen | ......... | H04W 36/0022 370/216 |
| 8,767,677 B2* | 7/2014 | Niemi | ................... | H04W 60/02 370/331 |
| 8,937,907 B2* | 1/2015 | Ryu | ................. | H04W 52/0229 370/328 |
| 9,226,256 B2* | 12/2015 | Velev | ..................... | H04W 60/06 |
| 9,451,505 B2* | 9/2016 | Zhao | ................. | H04W 36/0016 |
| 9,602,953 B2* | 3/2017 | Rashid | ..................... | H04W 4/70 |

(Continued)

FOREIGN PATENT DOCUMENTS

| | | | | |
|---|---|---|---|---|
| WO | WO-2016006948 A1 * | 1/2016 | .............. | H04W 4/90 |
| WO | WO-2016006980 A1 * | 1/2016 | ............. | H04W 48/16 |
| WO | WO-2016018012 A1 * | 2/2016 | ............. | H04W 48/02 |

*Primary Examiner* — Luat Phung
*Assistant Examiner* — Thomas R Cairns
(74) *Attorney, Agent, or Firm* — Birch, Stewart, Kolasch & Birch, LLP

(57) ABSTRACT

Provided are a method for a user equipment (UE) to perform access barring check in a wireless communication system, and an apparatus supporting the same. The method may include: performing the access barring check for a cell; if access to the cell is barred, starting a barring timer; and if a coverage enhancement (CE) level of the UE is changed in the cell, stopping the started barring timer.

6 Claims, 12 Drawing Sheets

(56) References Cited

U.S. PATENT DOCUMENTS

| | | | |
|---|---|---|---|
| 10,129,902 B2* | 11/2018 | Kaur | H04W 56/002 |
| 10,349,318 B2* | 7/2019 | Kim | H04W 72/042 |
| 2015/0237566 A1* | 8/2015 | Lee | H04W 48/08 |
| | | | 370/230 |
| 2016/0165473 A1* | 6/2016 | Lin | H04W 24/10 |
| | | | 370/252 |
| 2016/0205630 A1* | 7/2016 | Chen | H04W 76/27 |
| | | | 455/574 |
| 2016/0330768 A1* | 11/2016 | Hu | H04W 74/006 |
| 2016/0353440 A1* | 12/2016 | Lee | H04W 72/0453 |
| 2017/0135025 A1* | 5/2017 | Koskinen | H04W 48/02 |
| 2017/0318478 A1* | 11/2017 | Basu Mallick | H04L 5/0069 |
| 2018/0206080 A1* | 7/2018 | Chen | H04W 76/27 |
| 2018/0249508 A1* | 8/2018 | Gao | H04L 5/0053 |
| 2019/0044659 A1* | 2/2019 | Aln S | H04W 16/26 |
| 2019/0150218 A1* | 5/2019 | Futaki | H04W 76/19 |

\* cited by examiner

METHOD AND APPARATUS FOR PERFORMING ACCESS BARRING CHECK

CROSS-REFERENCE TO RELATED APPLICATIONS

This application claims the benefit of U.S. Provisional Application No. 62/501,775 filed on May 5, 2017, the contents of which are all hereby incorporated by reference herein in their entirety.

BACKGROUND OF THE INVENTION

Field of the Invention

The present invention relates to a wireless communication system, and more particularly, to a method for a user equipment (UE) to perform access barring check and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE INVENTION

As the environmental condition varies and UEs can move around, there might be the case that transmission conditions become bad. For example, if a network suffers from congestion because the environmental condition varies or extremely many number of UEs move around, access attempts may eventually fail. In this case, increasing repetition would cause even worse congestion. In this circumstances, it is necessary that the network may apply more stringent access class barring parameters. It is necessary to propose a method for performing access barring check for CE level, and an apparatus supporting the same.

One embodiment provides a method for performing, by a user equipment (UE), access barring check in a wireless communication system. The method may include: performing the access barring check for a cell; if access to the cell is barred, starting a barring timer; and if a coverage enhancement (CE) level of the UE is changed in the cell, stopping the started barring timer.

Another embodiment provides a user equipment (UE) performing access barring check in a wireless communication system. The UE may include: a memory; a transceiver; and a processor, connected with the memory and the transceiver, that: performs the access barring check for a cell; if access to the cell is barred, starts a barring timer; and if a coverage enhancement (CE) level of the UE is changed in the cell, stops the started barring timer.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
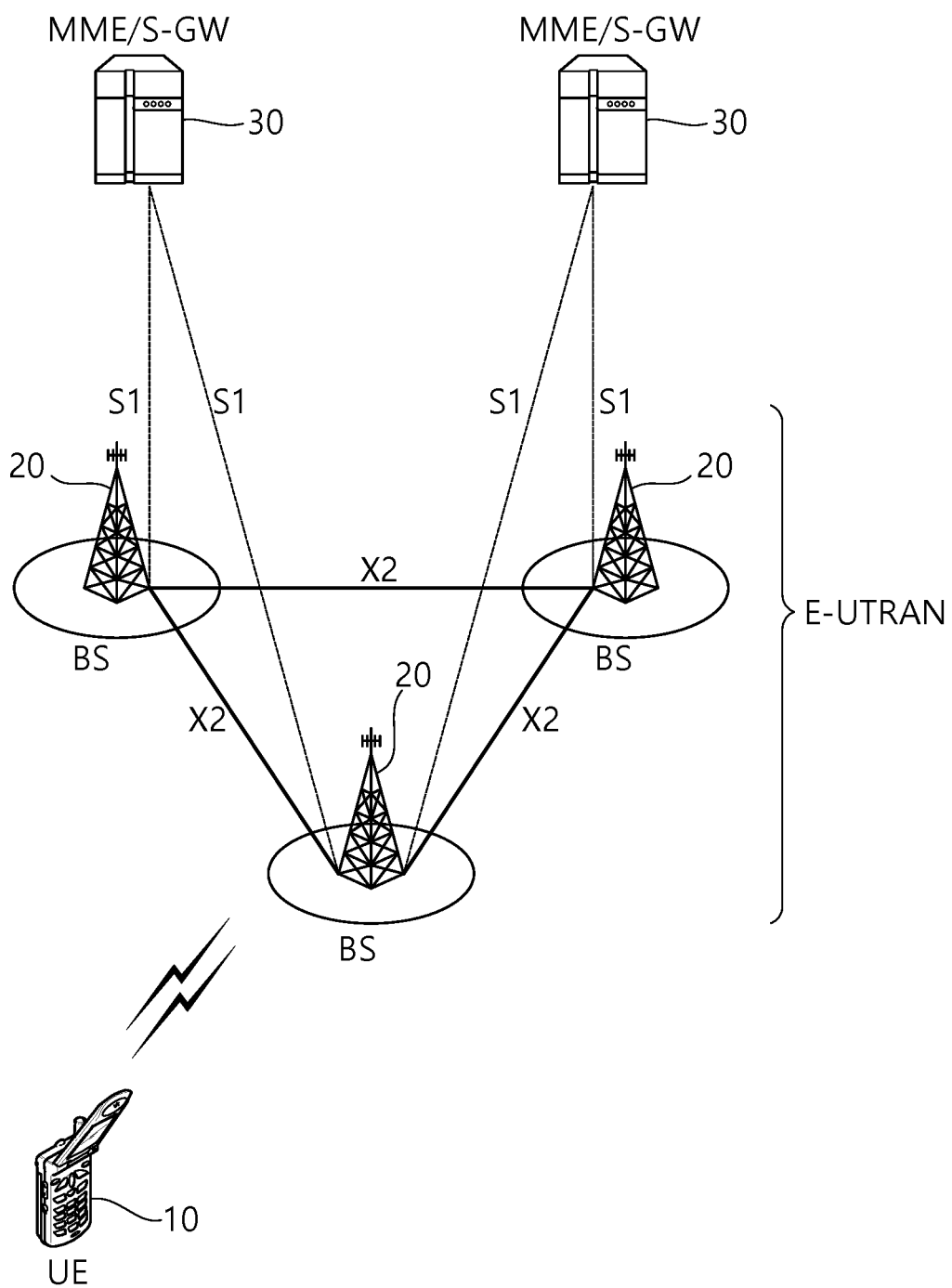
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell.

The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
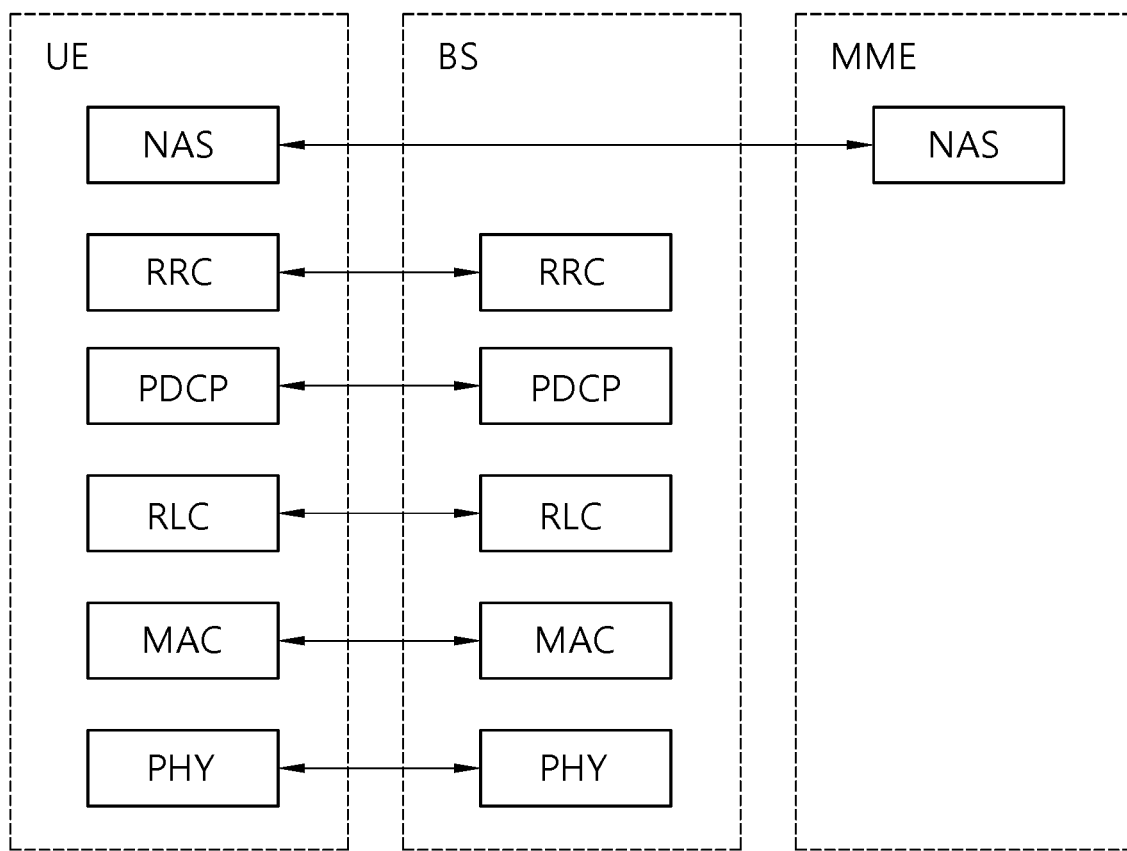
FIG. 2 shows a control plane of a radio interface protocol of an LTE system.
Figure 3:
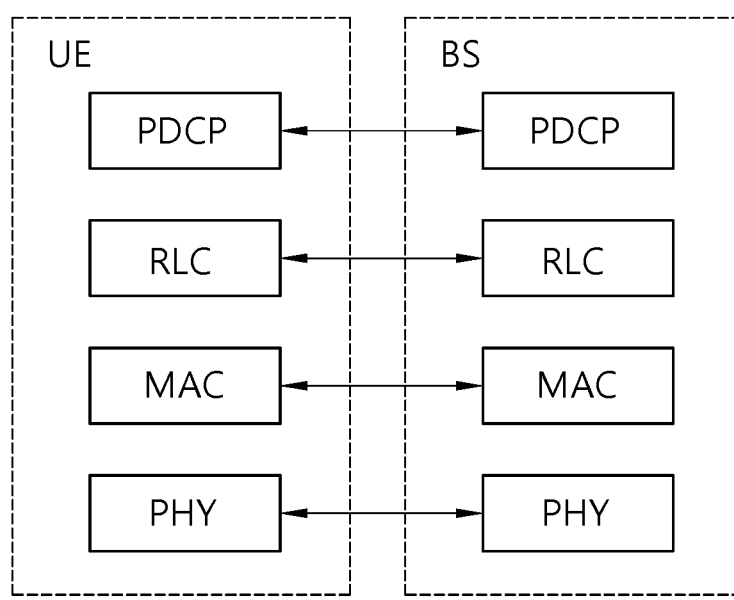
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCII also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
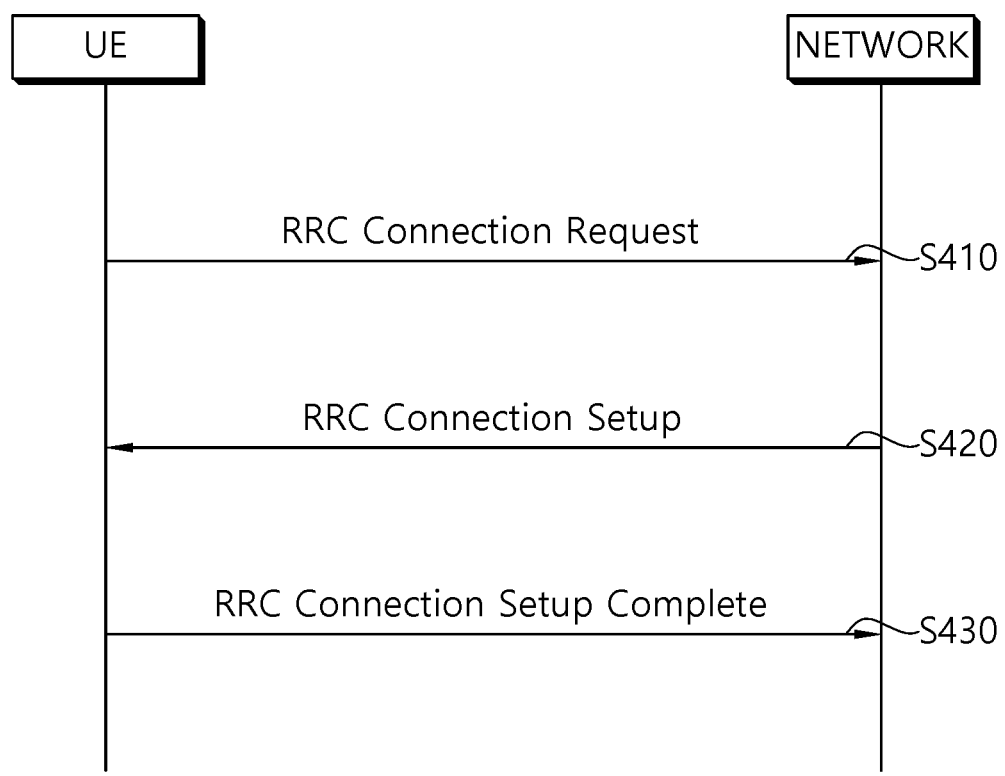
FIG. 4 shows an RRC connection establishment procedure.

FIG. 4 shows an RRC connection establishment procedure.

UE sends an RRC connection request message that requests RRC connection to a network (S410). The network sends an RRC connection establishment message as a response to the RRC connection request (S420). After receiving the RRC connection establishment message, the UE enters RRC connected mode.

The UE sends an RRC connection establishment complete message used to check the successful completion of the RRC connection to the network (S430).

Hereinafter, access class barring (ACB) will be described.

Figure 5:
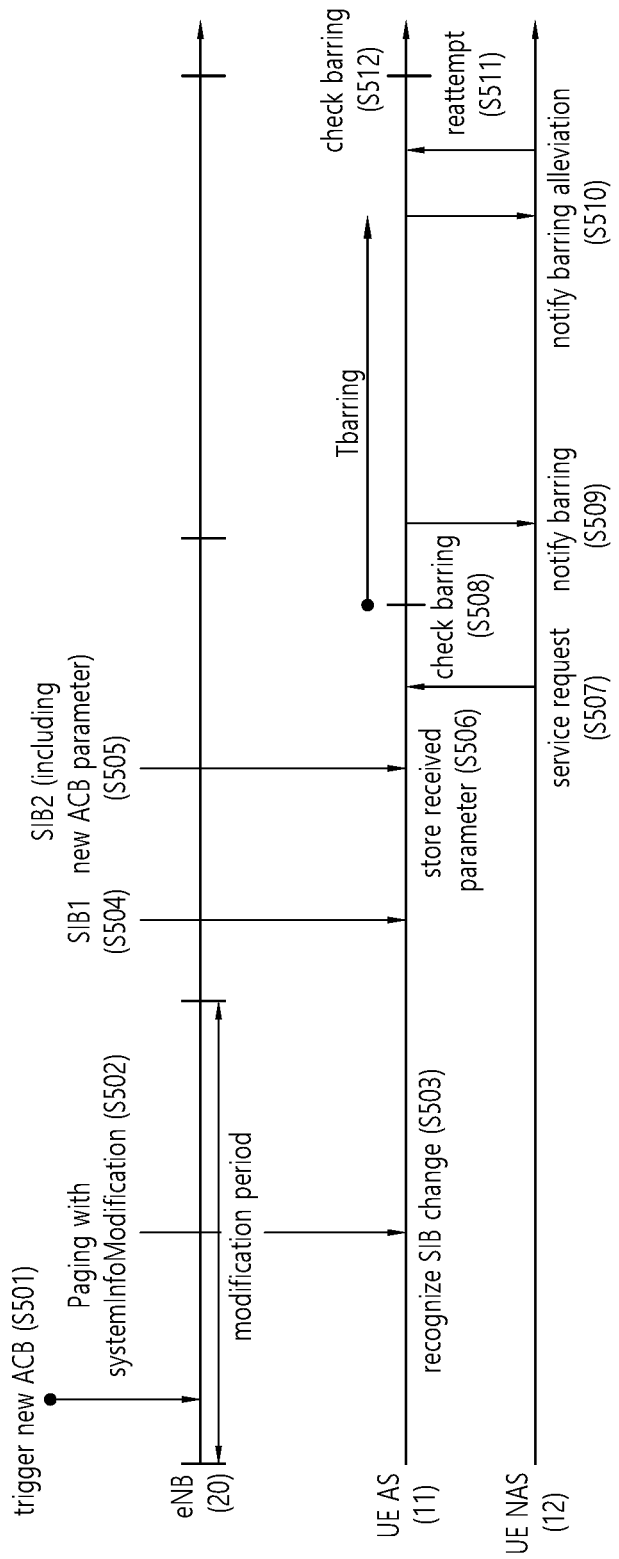
FIG. 5 shows an ACB operation.

FIG. 5 shows an ACB operation.

Referring to FIG. 5, ACB is a technique for controlling access of a UE to control system load, which includes a stage in which an eNB broadcasts barring information to UEs in advance and a stage in which UEs attempt to perform access based on a class that the UEs have and the barring information broadcast by the eNB 20. When new ACB information is triggered (S501), the eNB 20 may notify an UE AS 11 that SIB (SystemInformationBlock) information is to be changed soon due to the new ACB information, using a systemInfoModification IE of a paging (S502). The UE receiving the paging may recognize that the SIB information to be changed soon (S503). The systemInfoModication IE included in the paging is an indicator indicating that the SIB information is changed, and the indicator may have different forms according to embodiments.

The eNB 20 may notify the UE that the SIB information is to be changed soon through a paging in a modification period before broadcasting changed SIB information. Thereafter, the changed SIB information is broadcast in a next modification period.

After completing the modification period in which the paging is received, the UE receives SIB1 information to receive new SIB information (S504). There are several types of SIBs depending on purposes. SIB1 to SIB14 exist in Rel-11 LTE technology, and SIBs are continuously developed to support new functions of standard technologies. Among different SIBs, SIB1 may include scheduling information on other SIBs. Therefore, SIB1 needs to be received first in order to receive other SIB information.

Subsequently, the UE may receive SIB2 information including ACB information (S505). The UE AS 11 may store the ACB information (S506). A UE NAS 12 may send a service request to the UE AS 11 when a service, that is, communication, is needed (S507). Then, the UE AS 11 may determine whether to allow access based on the stored ACB information (S508). A UE is necessarily assigned a class with a value between 0 and 9. Further, the UE may further be assigned a class having a value of 11 to 15 for a special purpose. In addition, there is class 10 associated with an emergency call. The eNB 20 may restrict access to a particular class. In LTE technology, access to any designated one of classes 0 to 9 may not be restricted, and access to one or more designated classes among classes 11 to 15 for special purposes may be restricted.

Instead, the eNB 20 may provide a barring factor and barring time information with respect to classes 0 to 9. The barring factor may be a value ranging from 0 to 1. The UE selects one random value between 0 and 1 and compares the value with the barring factor. When the value selected by the UE is lower than the barring factor, it may be determined that access is allowed. When the value selected by the UE is higher than the barring factor, access is not allowed and the UE may notify the UE NAS 12 that access is not allowed (S509). When access is not allowed, the UE AS 11 may calculate a Tbarring value using the barring time information and the following equation. A method for calculating a Tbarring value according to an embodiment is as follows: "Tbarring"=(0.7+0.6*rand)*ac-BarringTime. A different Tbarring value may be calculated depending on an embodiment.

After Tbarring time, the UE AS 11 may notify the UE NAS 12 that it is possible to reattempt access (S510). Here, the UE NAS 12 reattempts to access the UE AS 11 (S511), and the UE AS 11 may perform a barring check again (S512). The process described in FIG. 5 may correspond to a general mobile originating (MO) call or signaling, that is, a service request triggered by a UE.

Figure 6:
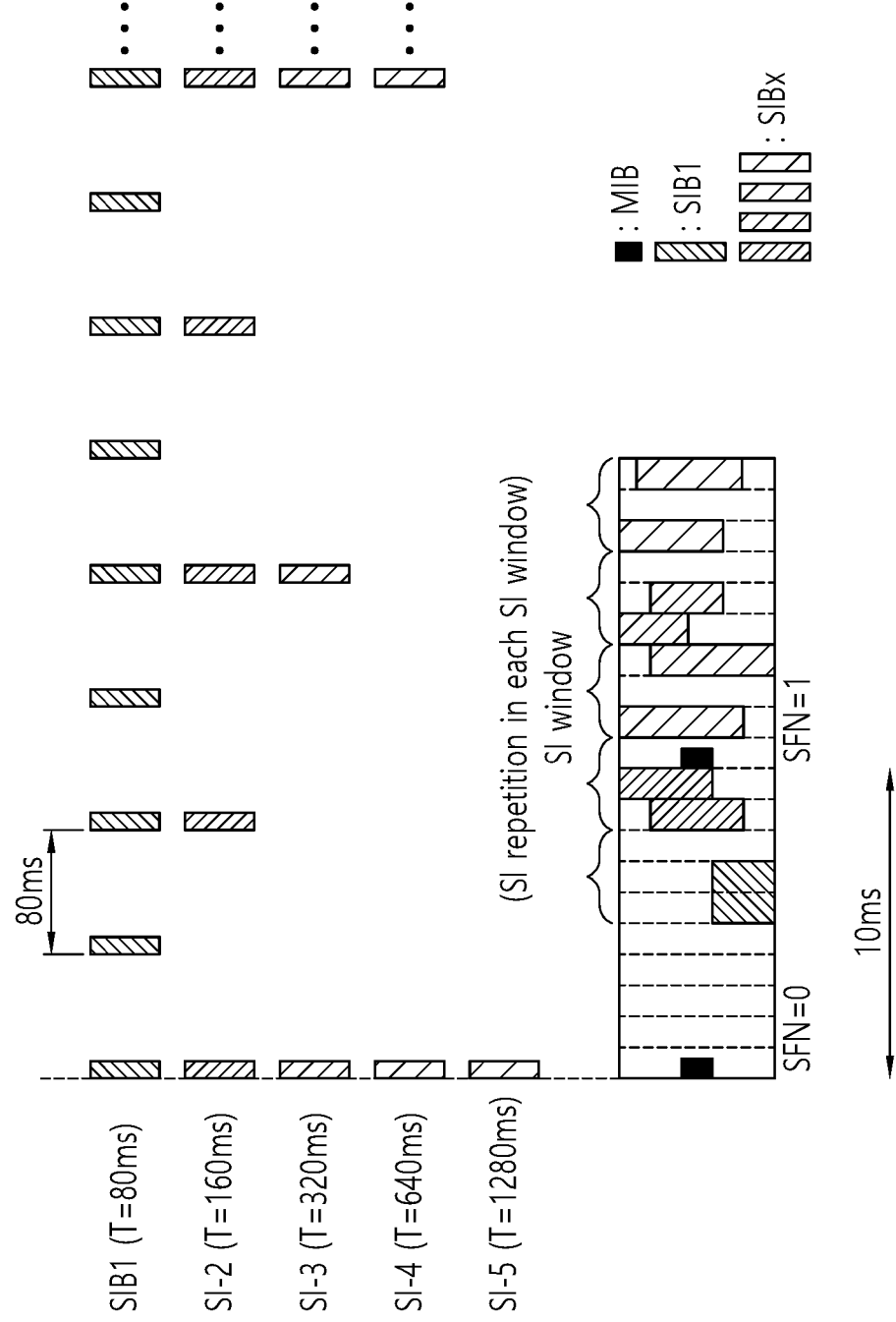
FIG. 6 shows an example of transmitting a master information block (MIB), system information block1 (SIB1), and other SIBs.

FIG. 6 shows an example of transmitting a master information block (MIB), system information block1 (SIB1), and other SIBs.

An LTE cell broadcasts basic parameters necessary for the operation of an IDLE_MODE UE and a CONNECTED MODE UE via a plurality of separate information blocks. Examples of information blocks include an MIB, SIB1, SIB2, and other SIBs (SIBn).

The MIB includes the most essential parameters needed for a UE to access a cell. Referring to FIG. 6, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN assistance information.

Hereinafter, machine-type communication (MTC) will be described.

Figure 7:
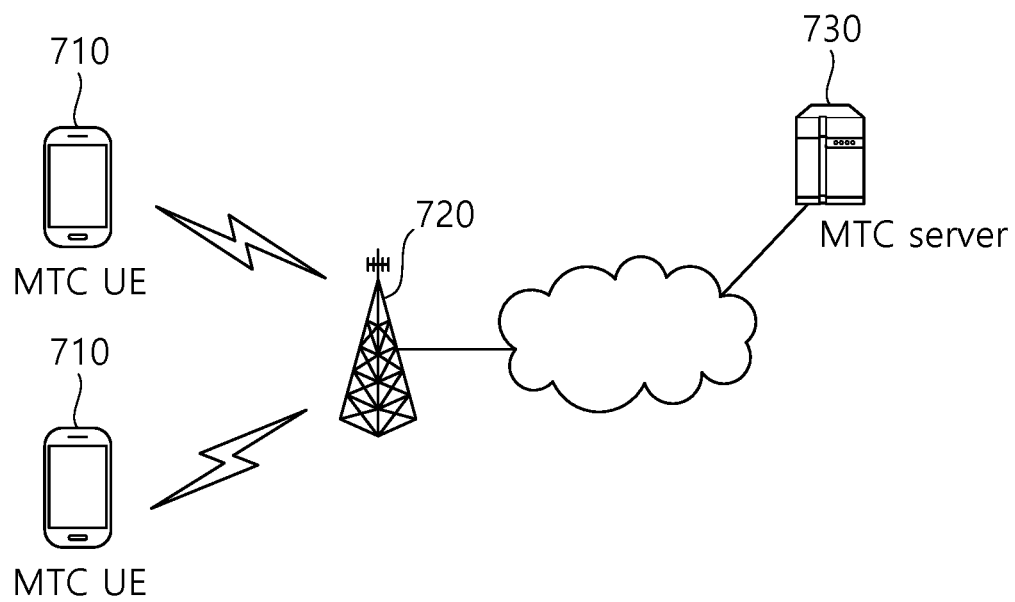
FIG. 7 shows an example of MTC.

FIG. 7 shows an example of MTC.

MTC refers to information exchange between MTC UEs 710 via a BS 720 without involving human interactions or information exchanges between an MTC UE 710 and an MTC server 730 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, a UE Category 0 UE, an NB-IoT UE, bandwidth reduced low complexity (BL) UE, a coverage-enhancement UE or a UE in enhanced coverage may be used with the same meaning. A normal UE or a UE in normal coverage may be used to refer to a UE other than the listed UEs.

The MTC server 730 is an entity communicating with the MTC UE 710. The MTC server 730 runs an MTC application and provides an MTC-specific service to an MTC device. The MTC UE 710 is a wireless device that provides MTC communication and may be fixed or mobile.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Meanwhile, when a UE fails to find a cell fulfilling cell selection criterion in normal mode, the UE may apply another cell selection criterion for enhanced coverage while operating in enhanced coverage mode. Operating in coverage enhancement (CE), the UE may apply different repetition number of preamble attempts, different maximum number of preamble attempts, different RAR window size or different contention resolution timer, depending on coverage enhancement (CE) level.

As the environmental condition varies and UEs can move around, there might be the case that transmission conditions become bad. In that situation, increasing repetition may cause the situation worse as the UEs in enhanced coverage use more resources. Especially when traffic attempts dramatically and suddenly increases, increasing repetition does not promise that the success probability of a Random Access (RA) procedure becomes high and rather cause wasting limited resources. Also, although the RA procedure succeeds, the UE may suffer due to high traffic load.

Figure 8:
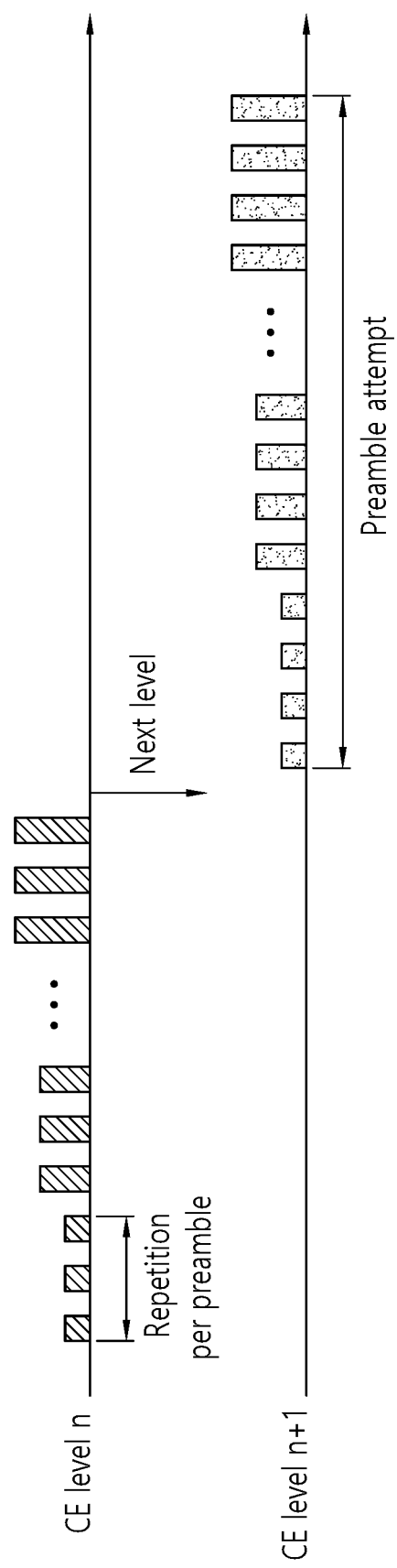
FIG. 8 shows an example of a UE increasing repetition.

FIG. 8 shows an example of a UE increasing repetition.

For example, if a network suffers from congestion because the environmental condition varies or extremely many number of UEs move around, access attempts may eventually fail. In this case, increasing repetition as described in FIG. 8 would cause even worse congestion. In this circumstances, it is necessary that the network may apply more stringent access class barring parameters.

Figure 9:
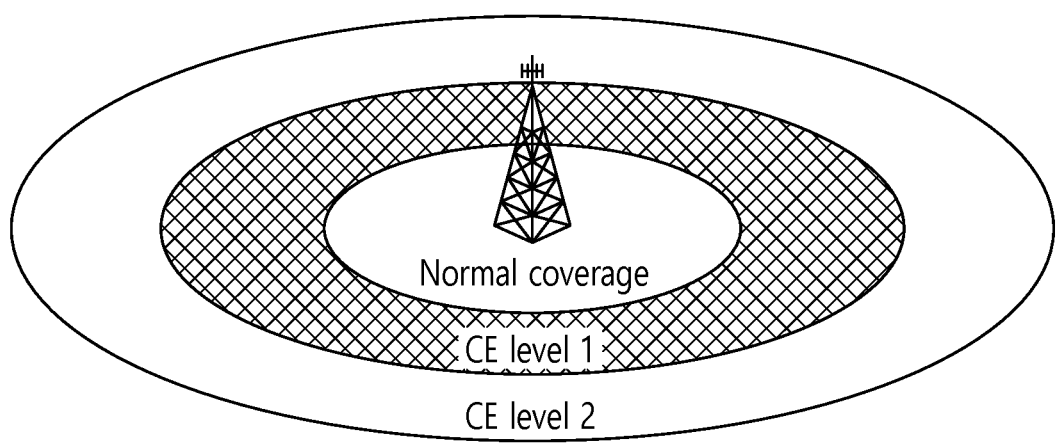
FIG. 9 shows an example that only the coverage in particular CE level suffers congestion.

FIG. 9 shows an example that only the coverage in particular CE level suffers congestion.

Since UEs in enhanced coverage and UEs in normal coverage receive different SIB2 messages containing different barring information, potentially with different values of barring factor and barring time. Further, UEs in same enhanced coverage level use random access resources associated with the same enhanced coverage level. Therefore, radio resources may be congested in CE levels while not congested in normal coverage. Similarly, radio resources may be congested in one CE level (e.g. CE level B) while not congested in another CE level (e.g. CE level A). For example, referring to FIG. 9, radio resources in a particular CE level (i.e., CE level 1) may be congested while not congested in another CE level (i.e., CE level 0 and CE level 2). In the present specification, the UE in normal coverage may correspond to the UE in CE level 0.

Hereinafter, a method for a UE to perform access barring check for CE level and an apparatus supporting the same according to an embodiment of the present invention are described in detail.

According to an embodiment of the present invention, system information block (SIB) that UEs receive in enhanced coverage may provide different barring information parameters for different CE levels. For example, the system information block may be system information block 2 (SIB2). The UEs may select access barring factors based on the CE level that the UEs are currently in. When the UE changes from one CE level to another CE level, an RRC layer of the UE may stop barring timer (if running), and may inform a NAS layer of the UE that barring is alleviated (if barring is applicable) so that the NAS layer of the UE may be allowed to trigger new RRC Connection Establishment for another CE level. The result of access barring check does not trigger change of the CE level.

Figure 10:
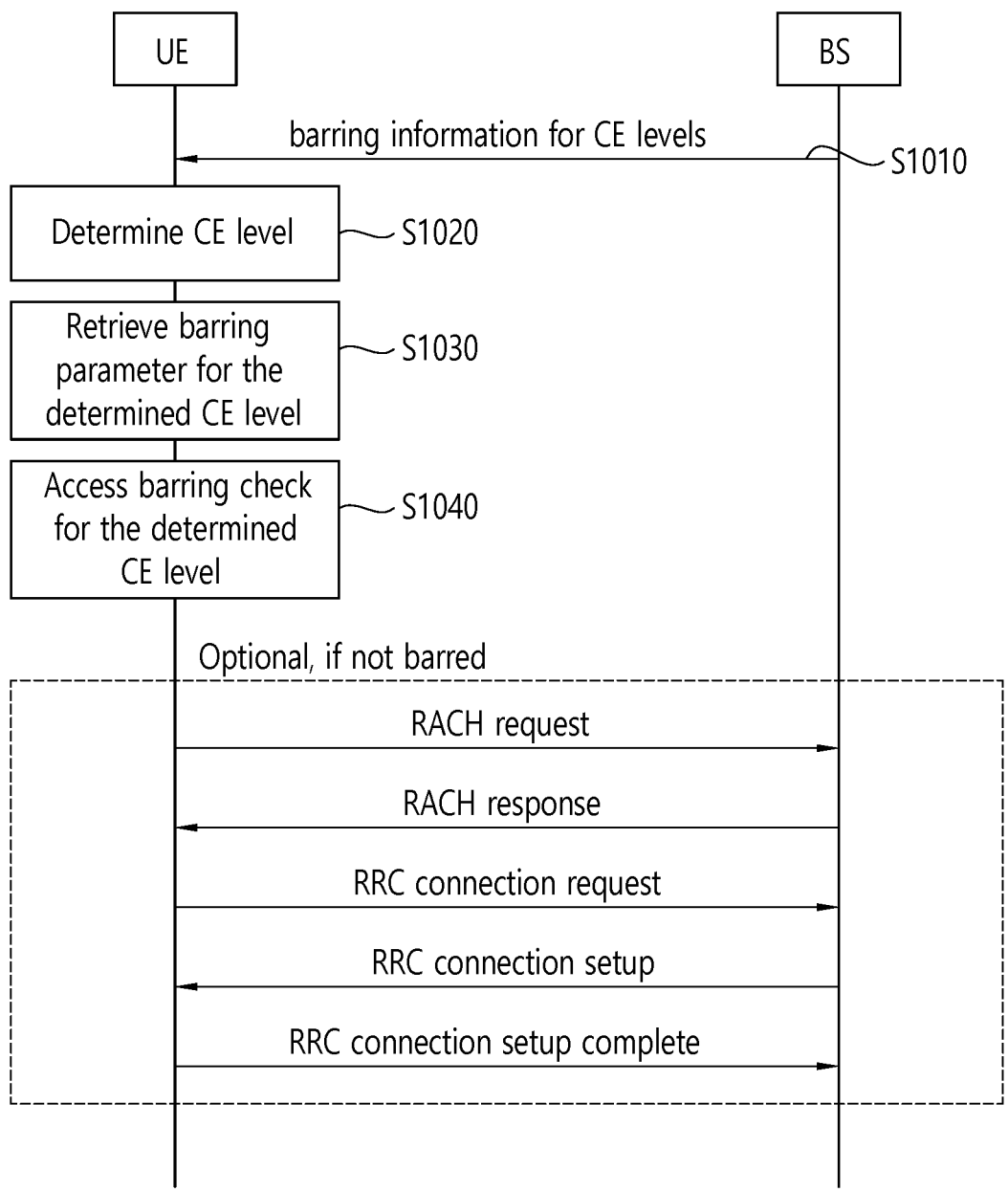
FIG. 10 shows a procedure in which a UE performs access barring check based on CE level according to an embodiment of the present invention.

FIG. 10 shows a procedure in which a UE performs access barring check based on CE level according to an embodiment of the present invention.

Referring to FIG. 10, in step S1010, the base station may broadcast MIB or SIB messages. The base station may be eNB or gNB. The SIB may be SIB2. The SIB may provide different barring information parameters for different CE levels. For example, the SIB may provide barring information parameters per CE level. For example, the SIB message providing barring information for CE level may be defined as shown in Table 1.

TABLE 1

| ac-BarringInfoForCE | | SEQUENCE { | |
|---|---|---|---|
| ac-BarringForCoverageLevel0 | AC-BarringConfig | OPTIONAL, | -- Need OP |
| ac-BarringForCoverageLevel1 | AC-BarringConfig | OPTIONAL, | -- Need OP |
| ac-BarringForCoverageLevel2 | AC-BarringConfig | OPTIONAL, | -- Need OP |
| ac-BarringForCoverageLevel3 | AC-BarringConfig | OPTIONAL, | -- Need OP |
| } | | | |

Referring to Table 1, the SIB may provide access barring parameters for at least one of CE level 0, CE level 1, CE level 2 or CE level 3. In Table 1, it is assumed that the access barring parameter is defined for CE levels 0 to 3, but this is merely an example, and the present invention is not limited to the above embodiment.

In step S1020, the UE may determine CE level. The UE may operate in enhanced coverage level. Then, the UE may apply SIB and SI messages, based on operation mode of the UE. For example, if the UE is in coverage enhancement (CE), the UE may apply BR version of SIB and SI messages. For example, if the UE is BL UE in normal coverage, the UE may apply BR version of SIB and SI messages. For example, if the UE is the NB-IoT UE, the UE may apply NB version of SIB and SI messages.

In step S1030, the UE may retrieve access barring information from the SIB for the determined CE level. The SIB may be SIB2.

In step S1040, the UE may check whether access to the cell is barred for the determined CE level. If access to the cell is not barred, the UE may start a random access procedure.

If access to the cell is barred, a RRC layer of the UE may start barring timer and inform a NAS layer of the UE that barring is applicable. However, if the UE changes to another CE level, the UE may not need to keep the barring status at the cell because the network condition may be different depending on in which mode the UE operates or in which level the UE operates. As the barring factors are independent for CE levels, the UE may re-initiate transmission trial regardless of barring status of the previous CE level.

If the UE changes from one CE level to another CE level, the RRC layer of the UE may stop barring timer (if running) and inform the NAS layer of the UE that barring is alleviated (if barring is applicable) so that the NAS layer of the UE is allowed to trigger new RRC Connection Establishment for another CE level.

Although the access is barred in a particular CE level, the UE shall not trigger change of the CE level for access attempts. The result of access barring check does not trigger change of the CE level.

As the environmental condition varies and UE moves around, there might be the case that channel quality becomes bad. In that situation, the UE would increase the repetitions, which results in using more resources. Especially when traffic attempts dramatically and suddenly increases, the network could not guarantee the QoS of the UE. In this circumstances, according to an embodiment of the present invention, the network can apply more stringent access class barring parameters, based on a CE level or repetition level of the UE. Further, according to an embodiment of the present invention, the network can deprioritize the UE in CE level requiring more repetitions compared to the UE requiring less repetitions. In addition, according to an embodiment of the present invention, the network can control the transmission attempts of UEs by separately applying barring factors for different repetition levels or different CE levels.

Figure 11:
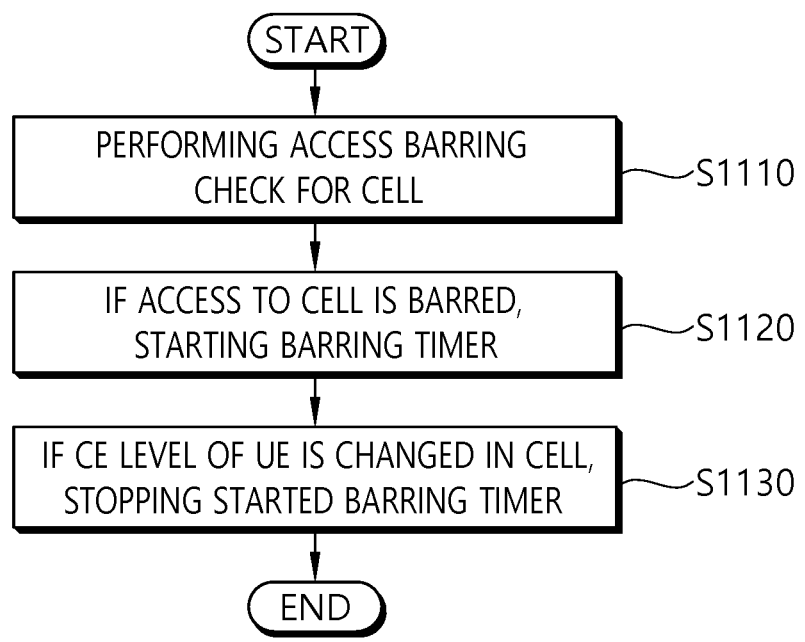
FIG. 11 is a block diagram illustrating a method for a UE to perform access barring check according to an embodiment of the present invention.

FIG. 11 is a block diagram illustrating a method for a UE to perform access barring check according to an embodiment of the present invention.

Referring to FIG. 11, in step S1110, the UE may perform the access barring check for a cell.

Further, the UE may receive, from a network, a system information block (SIB) including barring information per the CE level. The access barring check may be performed for the cell, based on the CE level of the UE and the barring information corresponding to the CE level of the UE.

In step S1120, if access to the cell is barred, the UE may start a barring timer.

In step S1130, if a coverage enhancement (CE) level of the UE is changed in the cell, the UE may stop the started barring timer. The CE level of the UE may be changed in the cell while the started barring timer is running. The CE level of the UE may be a first CE level when the access barring check is performed for the cell. After access to the cell is barred, the CE level of the UE may be changed in the cell from the first CE level to a second CE level while the started barring timer is running.

A radio resource control (RRC) layer of the UE may inform a non-access stratum (NAS) layer of the UE that barring is alleviated. After stopping the started barring timer, the RRC layer of the UE may inform the NAS layer of the UE that barring is alleviated. The NAS layer of the UE may trigger RRC connection establishment procedure for the changed CE level.

The CE level of the UE may be changed in the cell after stopping the started barring timer. Alternatively, the CE level of the UE may be changed in the cell before stopping the started barring timer.

Figure 12:
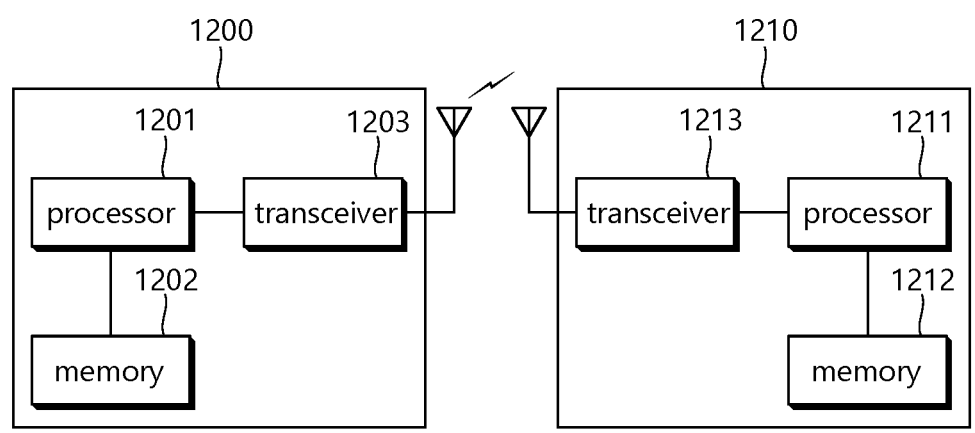
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing, by a user equipment (UE), an access barring check in a wireless communication system, the method comprising:
   receiving, from a network, a system information block 2 (SIB2) including a plurality of barring factors for each-coverage enhancement (CE) level;
   determining access barring for a cell based on a determination that a barring factor related to a CE level of the UE among the plurality of barring factors is greater than a random value between 0 and 1;
   starting a barring timer based on the access barring; and
   stopping the started barring timer based on a change of the CE level of the UE in the cell,
   wherein after stopping the started barring timer, a radio resource control (RRC) layer of the UE informs a non-access stratum (NAS) layer of the UE that barring is alleviated, and
   wherein the NAS layer of the UE triggers a new RRC connection establishment procedure for the changed CE level.

2. The method of claim 1, wherein the CE level of the UE is changed in the cell while the started barring timer is running.

3. The method of claim 1, wherein the CE level of the UE k a first CE level when the access barring is performed for the cell, and
   wherein after access to the cell is barred, the CE level of the UE is changed in the cell from the first CE level to a second CE level while the started barring timer is running.

4. A user equipment (UE) performing an access barring check in a wireless communication system, the UE comprising:
   a memory;
   a transceiver; and
   a processor, connected to the memory and the transceiver, that:
   receives, from a network, a system information block 2 (SIB2) including a plurality of barring factors for each coverage enhancement (CE) level;
   determines access barring for a cell based on a determination that a barring factor related to a CE level of the UE among the plurality of barring factors is greater than a random value between 0 and 1;
   starts a barring timer based on the access barring; and
   stops the started barring timer based on a change of the CE level of the UE in the cell,
   wherein after stopping the started barring timer, a radio resource control (RRC) layer of the UE informs a non-access stratum (NAS) layer of the UE that barring is alleviated, and
   wherein the NAS layer triggers of the UE triggers a new RRC connection establishment procedure for the changed CE level.

5. The UE of claim 4, wherein the CE level of the UE is changed in the cell while the started barring timer is running.

6. The UE of claim 4, wherein the CE level of the UE is a first CE level when the access barring is performed for the cell, and
   wherein after access to the cell is barred, the CE level of the UE is changed in the cell from the first CE level to a second CE level while the started barring timer is running.

* * * * *